United States Patent
Mizoguchi

(10) Patent No.: US 10,601,351 B2
(45) Date of Patent: Mar. 24, 2020

(54) MOTOR CONTROL APPARATUS, MOTOR CONTROL METHOD, AND PROGRAM

(71) Applicant: CANON KABUSHIKI KAISHA, Tokyo (JP)

(72) Inventor: Masahiko Mizoguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/948,411

(22) Filed: Apr. 9, 2018

(65) Prior Publication Data

US 2018/0302009 A1  Oct. 18, 2018

(30) Foreign Application Priority Data

Apr. 12, 2017  (JP) ................................. 2017-079028

(51) Int. Cl.
*H02P 8/22* (2006.01)
*B25J 9/16* (2006.01)

(52) U.S. Cl.
CPC ............... *H02P 8/22* (2013.01); *B25J 9/1656* (2013.01); *Y10S 901/02* (2013.01); *Y10S 901/24* (2013.01)

(58) Field of Classification Search
CPC ......... H02P 8/22; B25J 9/1656; Y10S 901/24; Y10S 901/02
See application file for complete search history.

(56) References Cited

U.S. PATENT DOCUMENTS

| | | | |
|---|---|---|---|
| 2001/0056324 A1* | 12/2001 | Miyazawa | B25J 9/1651 318/568.11 |
| 2006/0229745 A1* | 10/2006 | Ueda | G05B 19/416 700/63 |
| 2016/0079897 A1* | 3/2016 | Imaizumi | H02P 8/24 |

FOREIGN PATENT DOCUMENTS

| | | |
|---|---|---|
| JP | 7-163195 A | 6/1995 |
| JP | 2000-139099 A | 5/2000 |
| JP | 2001-119997 A | 4/2001 |

* cited by examiner

*Primary Examiner* — Kawing Chan
*Assistant Examiner* — Bradley R Brown
(74) *Attorney, Agent, or Firm* — Canon U.S.A., Inc. IP Division

(57) ABSTRACT

A motor control apparatus that controls a stepping motor includes a calculation unit configured to determine a time with respect to a distance based on a theoretical formula expressing a parameter in an acceleration period or deceleration period of the stepping motor. The calculation unit includes a first calculation unit and a second calculation unit. The first calculation unit is configured to apply an iterative root-finding procedure to a distance which is a function of a time included in the theoretical formula to determine the time with respect to the distance of the n-th step expressed using a reciprocal of a derivative of the function. The second calculation unit is configured to apply the iterative root-finding procedure to the reciprocal of the derivative to determine the reciprocal of the derivative at a time when the first calculation unit determines the time with respect to the distance of the n-th step.

17 Claims, 8 Drawing Sheets

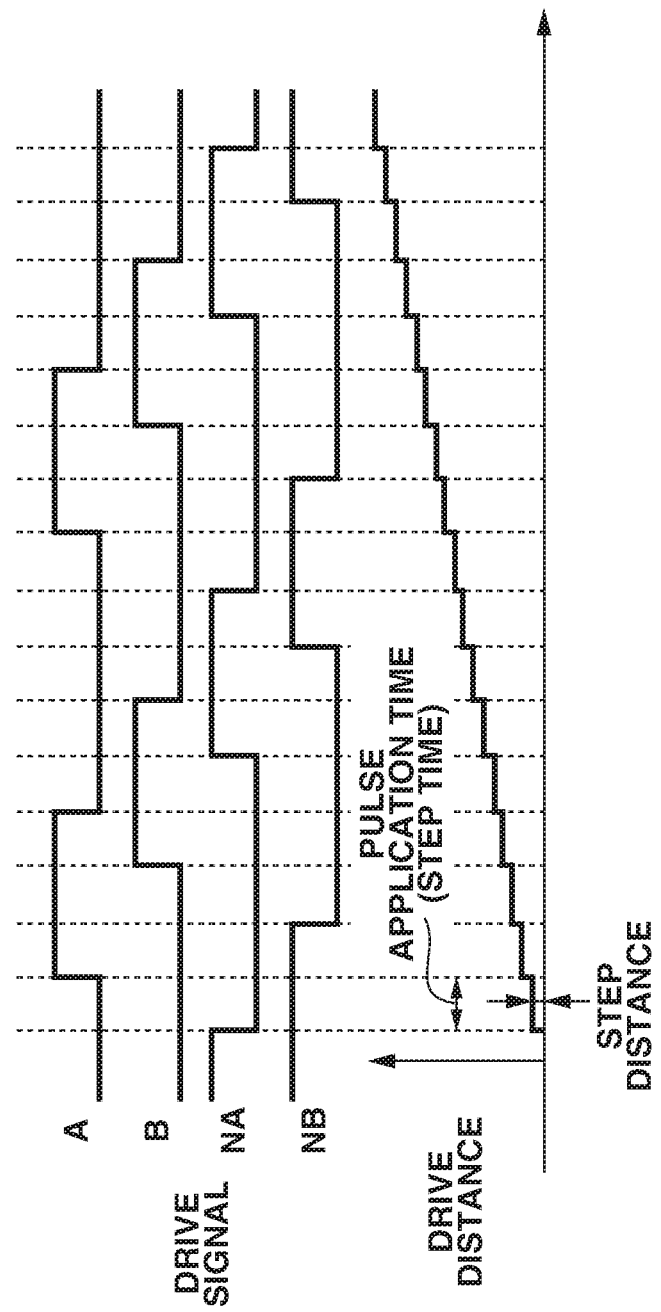

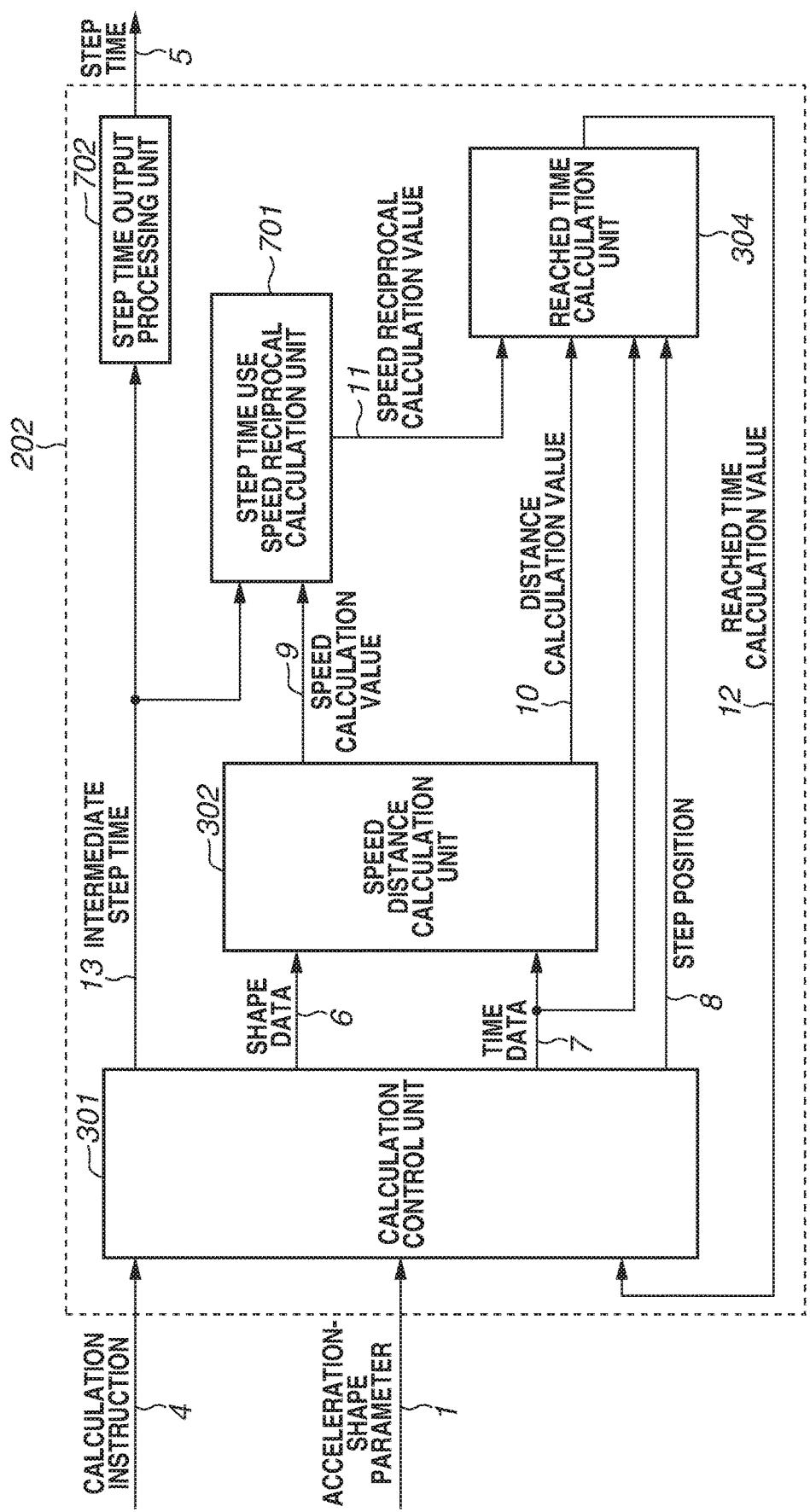

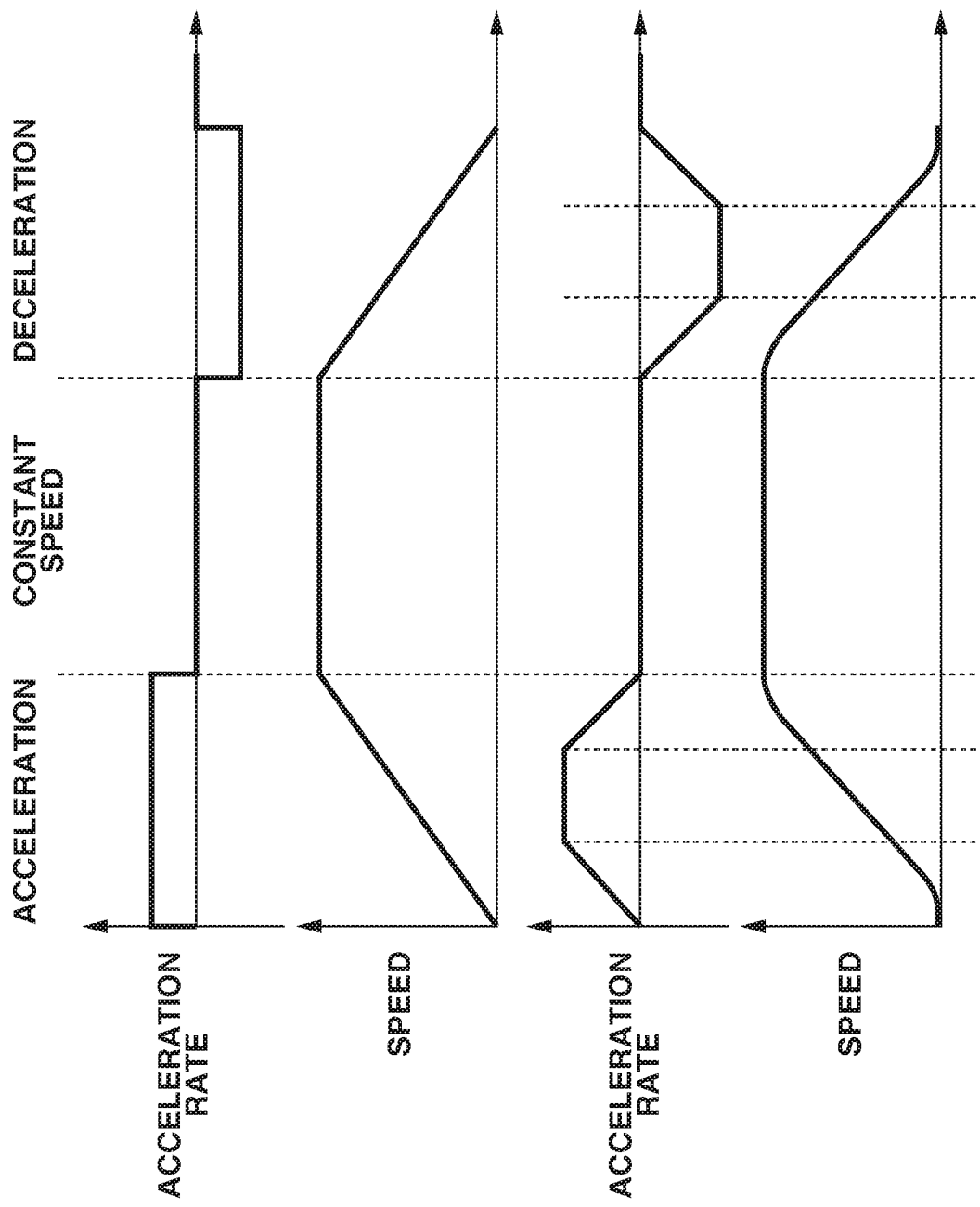

MOTOR CONTROL APPARATUS, MOTOR CONTROL METHOD, AND PROGRAM

BACKGROUND OF THE INVENTION

Field of the Invention

One disclosed aspect of the embodiments relates to a motor control apparatus that controls a stepping motor, and to a motor control method and a program.

Description of the Related Art

A stepping motor is driven according to a pulse signal and rotated by an angle corresponding to the number of pluses of the pulse signal at a rotation speed corresponding to a frequency of the pulse signal. Thus, if the speed of the stepping motor is to be controlled, the frequency and the number of pulses of the pulse signal need to be controlled, and a pulse signal application time needs to be calculated based on an instructed speed.

For example, Japanese Patent Application Laid-Open No. 2001-119997 discusses changing a micro-step interval in micro-step drive every ¼ cycle of a drive current of a pulse motor when the pulse motor is accelerated or decelerated. This enhances a speed resolution at the time of acceleration or deceleration of a moving object, so that the moving object can smoothly accelerate and decelerate.

In a stepping motor, as illustrated in FIG. 8A, trapezoidal control for controlling speed with respect to time in a trapezoidal shape is performed. In the trapezoidal control, a rotation speed of the stepping motor is gradually increased or decreased while an acceleration rate is constant at the time of acceleration or deceleration of the stepping motor. As for the trapezoidal control, for example, Japanese Patent Application Laid-Open No. 7-163195 discusses a configuration in which pulse train generation timing is calculated according to a recurrence formula.

Moreover, as illustrated in FIG. 8B, S-shaped control is known as a method for preventing a change in acceleration rate in the trapezoidal control. The S-shaped control changes an acceleration rate in a trapezoidal shape at the time of acceleration and deceleration of a stepping motor.

Moreover, an acceleration and deceleration pulse generating apparatus using a pattern memory for storing acceleration and deceleration pattern data of various velocity curves has been proposed to change pulse signals into various acceleration and deceleration patterns. Such an acceleration and deceleration pulse generating apparatus successively reads the acceleration and deceleration pattern data stored in the pattern memory, and converts the acceleration and deceleration pattern data into serial data by using a parallel-serial conversion circuit to output the serial data as a pulse signal.

Moreover, Japanese Patent Application Laid-Open No. 2000-139099 proposes a method for controlling a change in acceleration rate. According to the method, a speed pattern including a plurality of straight lines is calculated using a simple recurrence formula, and an acceleration rate to be substituted into the recurrence formula is set to an acceleration rate of a next straight-line or an acceleration rate of a previous straight-line at an acceleration rate change point. This prevents a change in acceleration rate.

In a case where speed of a stepping motor is controlled, the speed control is ideally performed according to a calculation based on a physical theory expressing stepping motor behavior. However, a calculation such as a square root calculation and a cubic root calculation needs to be performed depending on a physical theoretical formula. This increases a circuit size and a processing time to solve the calculation.

On the other hand, if speed of the stepping motor is controlled according to an approximate calculation, there are advantages in terms of a circuit size and a processing time. However, depending on accuracy of the approximation calculation, a theoretical speed pattern may not be acquired or various speed patterns may not be dealt with, which may lead to some problems. For example, there is a case where a sudden change in an acceleration rate cannot be prevented in a suitable manner, and as a result, vibrations are generated. In some cases, an acceleration time or a deceleration time may need to be extended to prevent generation of vibration. Moreover, in a case where data such as acceleration and deceleration pattern data are stored in a memory, if an acceleration and deceleration period becomes longer, there is a problem in which capacity of a necessary memory is increased with an increase in the number of acceleration and deceleration patterns or enhancement of micro-step drive accuracy. Accordingly, there is a possibility that such speed control may not be suitable for a stepping motor to be used for, for example, a medical robot hand which employs a joystick to dynamically control the position and the speed thereof.

SUMMARY OF THE INVENTION

One embodiment is directed to execution of speed control of a stepping motor according to a calculation based on a physical theory and to prevention of increases in a circuit size and a processing time.

According to an aspect of the embodiments, a motor control apparatus that controls a stepping motor includes a calculation unit configured to determine a time with respect to a distance of n-th step (n is a positive integer) to calculate a step time, which is a pulse signal application time with respect to the stepping motor, based on a theoretical formula expressing a parameter in an acceleration period or a deceleration period of the stepping motor. The calculation unit includes a first calculation unit and a second calculation unit. The first calculation unit is configured to apply an iterative root-finding procedure to a distance which is a function of a time included in the theoretical formula to determine the time with respect to the distance of the n-th step expressed using a reciprocal of a derivative of the function. The second calculation unit is configured to apply the iterative root-finding procedure to the reciprocal of the derivative to determine the reciprocal of the derivative at a time when the first calculation unit determines the time with respect to the distance of the n-th step.

Further features of the disclosure will become apparent from the following description of exemplary embodiments with reference to the attached drawings.

BRIEF DESCRIPTION OF THE DRAWINGS

FIG. 6 is a diagram illustrating an example of a drive waveform pattern of 1-2 phase excitation drive.

FIG. 7 is a block diagram illustrating a configuration of a step time calculation unit of a drive control unit according to a second exemplary embodiment.

FIGS. 8A and 8B are diagrams each illustrating an example of speed control of a stepping motor.

DESCRIPTION OF THE EMBODIMENTS

Exemplary embodiments are hereinafter described with reference to the drawings.

A motor control apparatus and a motor control method according to a first exemplary embodiment will be described.

(Configuration of Motor Control Apparatus)

Figure 1:
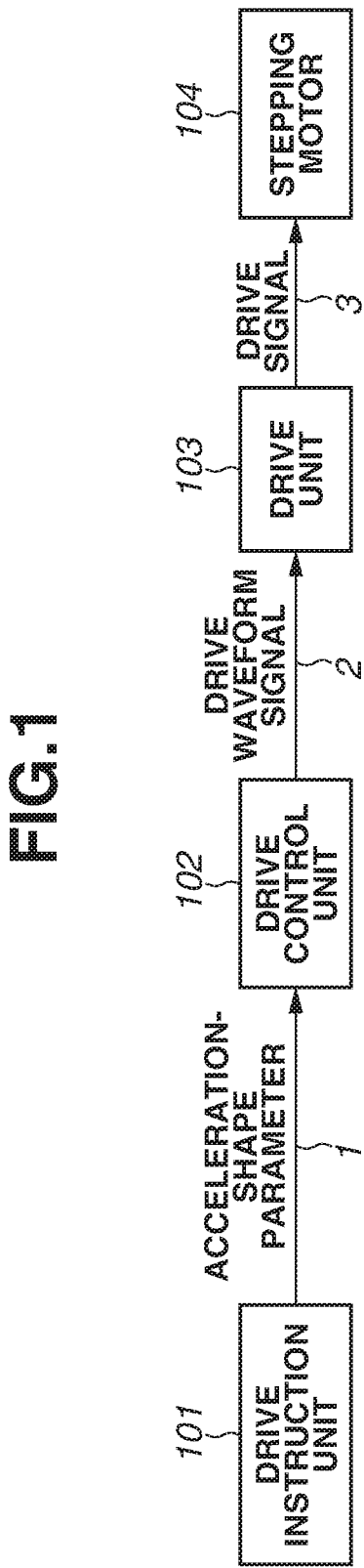
FIG. 1 is a block diagram illustrating a configuration of a motor control apparatus according to a first exemplary embodiment.

FIG. 1 is a block diagram illustrating a configuration of a motor control apparatus according to the first exemplary embodiment.

A drive instruction unit 101 calculates an acceleration-shape parameter 1, which is acceleration-shape information, based on, for example, a drive condition provided from a higher-level control unit, and outputs the acceleration-shape parameter 1 to a drive control unit 102.

Figure 5:
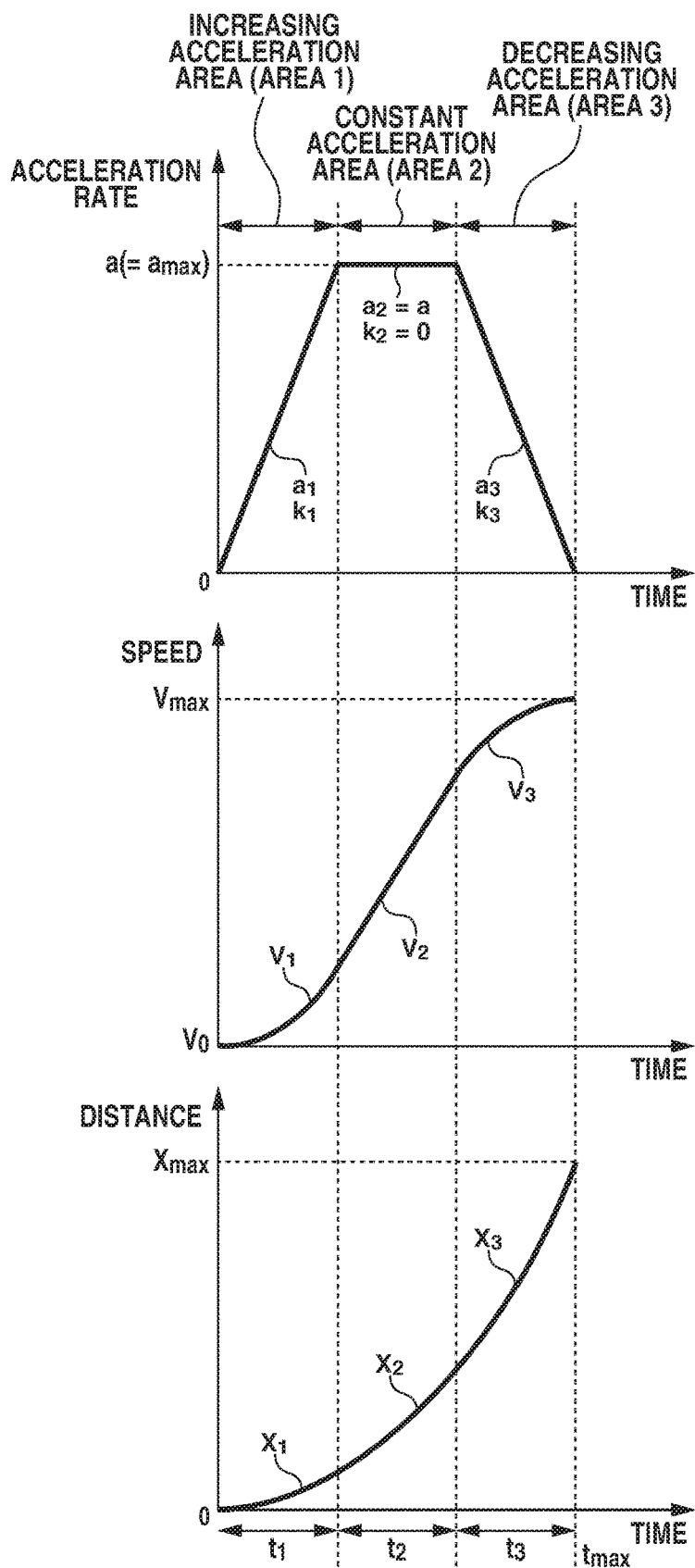
FIG. 5 is a diagram illustrating parameters of acceleration control in S-shaped control.

In the present exemplary embodiment, acceleration control in S-shaped control described with reference to FIG. 8B will be described. FIG. 5 is a diagram illustrating a relation between a parameter to serve as a drive condition of the acceleration control in the S-shaped control and the acceleration-shape parameter 1. The parameter to serve as the drive condition include an initial speed ($v_0$), a reached speed ($v_{max}$), a reached distance ($x_{max}$), a reached time ($t_{max}$), and a maximum acceleration rate ($a=a_{max}$). Moreover, in an acceleration period in which the acceleration control in the S-shaped control is executed, an increasing acceleration area (an area 1) in which an acceleration rate increases, a constant acceleration area (an area 2) in which an acceleration rate is constant, and a decreasing acceleration area (an area 3) in which an acceleration rate decreases are set. In the acceleration period, the acceleration-shape parameter 1 includes acceleration rate gradients $k_1$ through $k_3$, acceleration rates $a_1$ through $a_3$, speeds $v_1$ through $v_3$, distances (step positions) $x_1$ through $x_3$, and reached times $t_1$ through $t_3$ in the respective areas 1 through 3. The drive condition can include the acceleration-shape parameter per se. However, the drive condition can include at least information necessary for calculation of the acceleration-shape parameter. Deceleration control in the S-shaped control and a deceleration period in which the deceleration control is executed are respectively similar to the acceleration control and the acceleration period, differing only in a drive condition and an acceleration-shape parameter. Thus, a description of the deceleration control and the deceleration period is omitted.

The drive control unit 102 calculates an application time (also referred to as a "step time") of a pulse signal for drive of a stepping motor 104 based on the acceleration-shape parameter 1 output from the drive instruction unit 101, and outputs a drive waveform signal 2 to a drive unit 103 according to the calculated step time.

The drive unit 103 is an analog circuit that supplies a voltage and an electric current as drive signals 3 to the stepping motor 104 based on the drive waveform signal 2 output from the drive control unit 102. The voltage and the electric current to be supplied as the drive signals 3 are necessary to actually drive the stepping motor 104.

The stepping motor 104 rotates on a step angle basis determined according to a motor structure based on the number of pulses of the drive signal 3 output from the drive unit 103. A rotation speed of the stepping motor 104 corresponds to a frequency of the drive signal 3. Although a detailed description of the stepping motor structure and the drive method including micro-step drive will be omitted, a drive waveform pattern example of the 1-2 phase excitation drive is illustrated in FIG. 6 as one example.

(Acceleration Control in S-shaped Control)

Hereinafter, a detailed description will be given of a configuration of the drive control unit 102 and a process in which the drive control unit 102 calculates a step time based on the acceleration-shape parameter 1.

Figure 2:
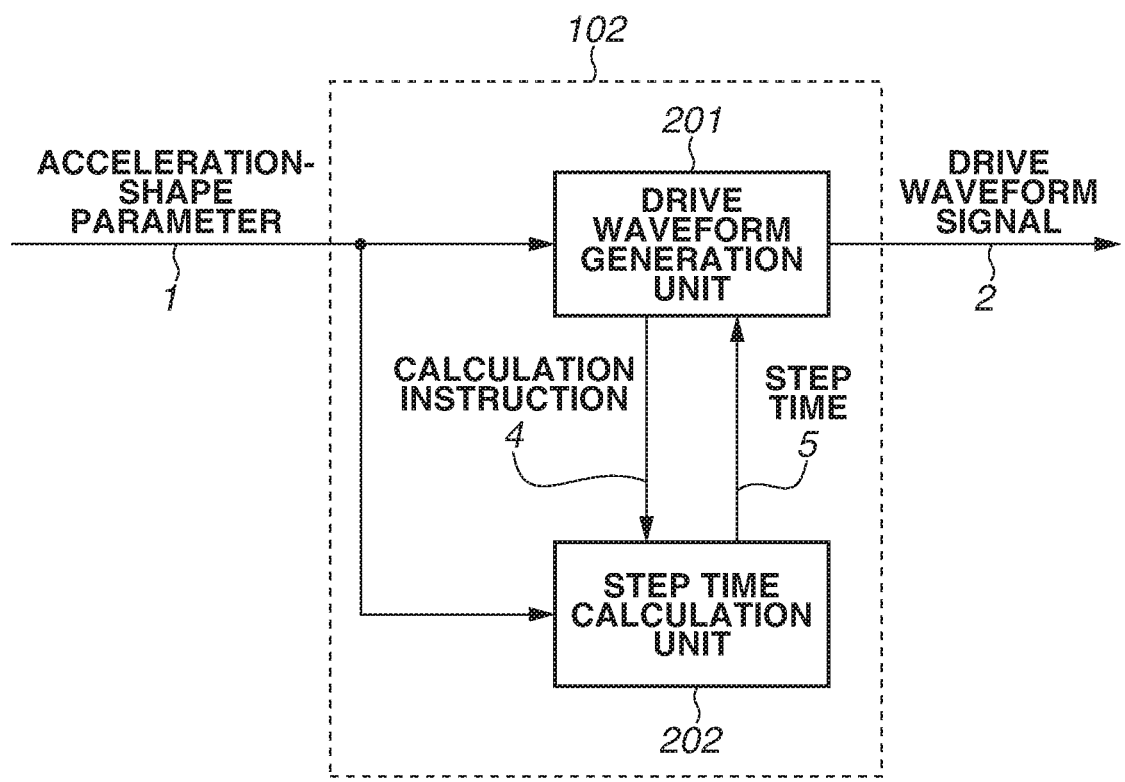
FIG. 2 is a diagram illustrating a detailed configuration of a drive control unit according to the first exemplary embodiment.

FIG. 2 is a diagram illustrating a detailed configuration of the drive control unit 102. As illustrated in FIG. 2, the drive control unit 102 includes a drive waveform generation unit 201 and a step time calculation unit 202.

For example, if a drive start instruction is issued by a higher-level control unit, the drive waveform generation unit 201 outputs a calculation instruction 4 to the step time calculation unit 202. The step time calculation unit 202 calculates a step time 5 by using the algorithm described below according to the calculation instruction 4 received from the drive waveform generation unit 201 as a trigger, and outputs the step time 5 to the drive waveform generation unit 201. The drive waveform generation unit 201 generates a drive waveform based on the step time 5 received from the step time calculation unit 202, and outputs the drive waveform signal 2.

More specifically, the drive waveform generation unit 201 retains a time of the step time 5 and a drive waveform of a predetermined pattern (e.g., waveforms A, B, NA, and NB illustrated in FIG. 6). Moreover, since a pattern for next time needs to be changed when the step time 5 has elapsed, the drive waveform generation unit 201 outputs a current drive waveform signal 2. At the same time, the drive waveform generation unit 201 outputs the calculation instruction 4 for calculation of a step time 5 for next time to the step time calculation unit 202. Such an operation is repeated until a reached speed ($v_{max}$) or a reached distance ($x_{max}$) is reached, or a reached time ($t_{max}$) has elapsed to accelerate the stepping motor 104. After the acceleration of the stepping motor 104 is finished, the drive waveform generation unit 201 continues to generate the drive waveform signal 2 in a certain step time to maintain the speed of the stepping motor 104. For this step time, a final step time at which the acceleration is substantially finished is used. Then, if a deceleration instruction or a re-acceleration instruction is issued by the higher-level control unit, deceleration control or acceleration control similar to the above-described acceleration control from the beginning of drive is performed.

(Calculation of Step Time)

Next, a detailed description will be given of a process for calculating a step time by the step time calculation unit 202. The step time calculation unit 202 uses a convergence calculation according to Newton's method to calculate a step time. An algorithm of such a calculation is described in detail.

First, a physical theoretical formula (Formula 1) that expresses the acceleration rates $a_1$ through $a_3$, the speed $v_1$ through $v_3$, and the distances $x_1$ through $x_3$ described above will be described.

$$a_1 = k_1 \cdot t \qquad \text{[Formula 1]}$$

$$a_2 = a$$

$$a_3 = a - k_3(t - t_1 - t_2)$$

$$v_1 = \frac{1}{2}k_1 \cdot t^2 + v_0$$

$$v_2 = \frac{1}{2}k_1 \cdot t_1^2 + a(t - t_1) + v_0$$

$$v_3 = \frac{1}{2}k_1 \cdot t_1^2 + a \cdot t_2 + a(t - t_1 - t_2) - \frac{1}{2}k_3(t - t_1 - t_2)^2 + v_0$$

$$x_1 = \frac{1}{6}k_1 \cdot t^3 + v_0 \cdot t$$

$$x_2 = \frac{1}{6}k_1 \cdot t_1^3 + \frac{1}{2}k_1 \cdot t_1^2(t - t_1) + \frac{1}{2}a(t - t_1)^2 + v_0 \cdot t$$

$$x_3 = \frac{1}{6}k_1 \cdot t_1^3 + \frac{1}{2}k_1 \cdot t_1^2 \cdot t_2 +$$

$$\frac{1}{2}k_1 \cdot t_1^2(t - t_1 - t_2) + \frac{1}{2}a \cdot t_2^2 + a \cdot t_2(t - t_1 - t_2) +$$

$$\frac{1}{2}a(t - t_1 - t_2)^2 - \frac{1}{6}k_3(t - t_1 - t_2)^3 + v_0 \cdot t$$

As described above with reference to FIG. 5, in the acceleration period, the increasing acceleration area (the area 1), the constant acceleration area (the area 2), and the decreasing acceleration area (the area 3) are set. Although suffixes 1 through 3 indicate the respective areas, the suffixes are omitted in the following description.

In Formula 1, the step time 5 necessary for speed control of the stepping motor 104 is a difference t(step_n)–t(step_n–1) between a reached time t(step_n) with respect to a distance x(step_n) of n-th step (step_n) and a reached time t(step_n–1) with respect to a distance x(step_n–1) of a previous step ((n–1)th step) (n is a positive integer). Herein, x(step_n) or x(step_n–1) corresponds to a specific step angle arising from a motor structure. Moreover, x(step_n)–x(step_n–1) is substantially the same as 1 step angle, or 1 pulse if standardized in such a system of units as, for example, pulse per sec (pps). In a case where micro-step drive is used, a resolution is enhanced and a smaller value is acquired. However, a value that is generally divided by a power of 2 is used.

As described above, if the step time 5 is to be calculated, a reached time t(step_n) with respect to a distance x(step_n) of n-th step needs to be determined based on the physical theoretical formula of Formula 1.

In this case, if the physical theoretical formula of Formula 1 is solved for the reached time t, a cubic function expressing the distance x needs to be solved. Hence, a calculation such as a cubic root calculation or a square root calculation is necessary, causing increases in a circuit size and a processing time.

In the present exemplary embodiment, an iterative root-finding procedure, may be applied to determine the reached time t(step_n). Examples of such procedure include the Newton's method, the secant method, the inverse interpolation, or a combination of these methods. With the Newton's method, the procedure may be applied in two stages. In this way, the speed control of the stepping motor 104 is executed according to the calculation based on the physical theoretical formula of Formula 1, and a circuit size and a processing time can be markedly reduced since calculations such as the cubic root calculation and the square root calculation are not necessary.

A description will be given of determination of a reached time t(step_n) by application of Newton's method in two stages. Formula 1 can be rewritten as Formula 2 if a function expressing the distance x in Formula 1 is generalized. A suffix step_n represents a distance or a reached time in n-th step (step_n), and indicates the same thing as x(step_n) or t(step_n).

$$x_{step\_n} = f_x(t_{step\_n})$$

$$f_x(t_{step\_n}) - x_{step\_n} = 0 \qquad \text{[Formula 2]}$$

If Newton's method (also referred to as a "first Newton's method") is applied to determine a reached time t(step_n) that satisfies Formula 2, Formula 3 is acquired.

$$t_{loop\_m+1} \cong t_{loop\_m} - \frac{f_x(t_{loop\_m}) - x_{step\_m}}{f'_x(t_{loop\_m})} \qquad \text{[Formula 3]}$$

Figure 4A:
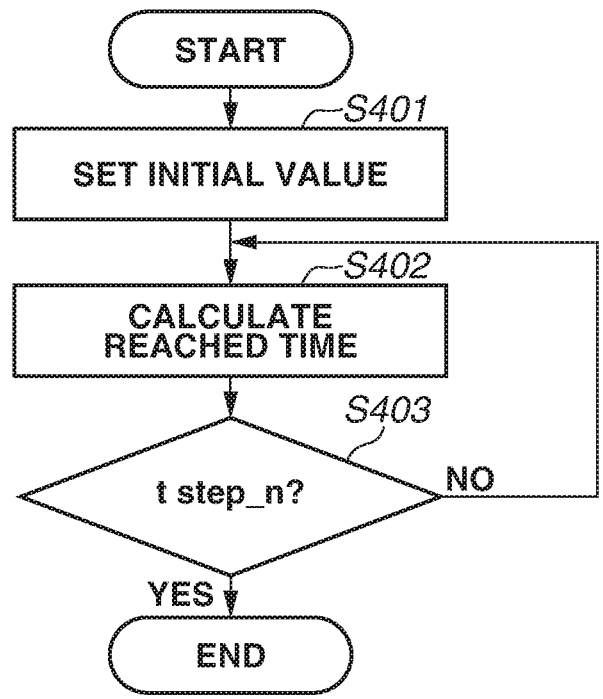
FIGS. 4A and 4B are flowcharts illustrating a process for determining a reached time and a reciprocal of a derivative by applying Newton's method in two stages according to the first exemplary embodiment.

A suffix loop_m represents the number of loop calculations m for determination of the reached time t(step_n), and indicates the same thing as t(loop_m). FIG. 4A illustrates an example of a process for determining a reached time t(step_n) according to the first Newton's method. In step S401, an initial value to be used in an initial loop calculation is set. In steps S402 and S403, the initial value is used in the initial loop calculation, and t(loop_m) determined by a previous loop calculation is used in subsequent calculations to repeatedly calculate and update t(loop_m), thereby allowing t(loop_m) to converge on a reached time t(step_n) to be determined.

Herein, in Formula 3, $f'_x(t(loop\_m))$ is a derivative of $f_x(t(loop\_m))$. However, since $f'_x(t(loop\_m))$ is acquired by differentiating a distance x, it is substantially the same as a speed v. Newton's method (also referred to as a "second Newton's method") is applied to a reciprocal of the derivative $f'_x(t(loop\_m))$ in Formula 3, that is, a reciprocal of the speed v. Formula 4 is acquired if attention is paid only to a reciprocal of the derivative $f'_x(t(loop\_m))$.

$$\frac{1}{f'_x(t_{loop\_m})} = s_{loop\_m} \qquad \text{[Formula 4]}$$

$$s_{loop\_l+1} \cong s_{loop\_l}(2 - f'_x(t_{loop\_m}) \cdot s_{loop\_l})$$

Figure 4B:
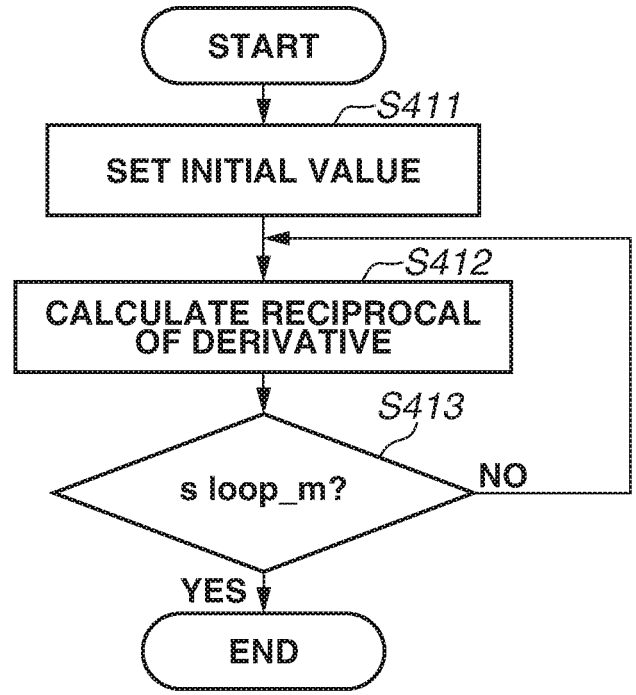

A suffix loop_l represents the number of loop calculations l for determination of a reciprocal s(loop_m) of the derivative $f'_x(t(loop\_m))$, and indicates the same thing as s(loop_l)). FIG. 4B illustrates an example of a process for determining a reciprocal s(loop_m) of a derivative $f'_x(t(loop\_m))$. This process is executed when t(loop_m) is calculated in the process illustrated in FIG. 4A. In step S411, an initial value to be used in an initial loop calculation is set. In steps S412 and S413, the initial value is used in the initial loop calculation, and s(loop_l) determined by a previous loop calculation is used in subsequent calculations to repeatedly calculate and update s(loop_l), thereby allowing s(loop_l) to converge on s(loop_m) to be determined.

In this case, the number of loop calculations l according to the second Newton's method is set so as to be smaller than the number of loop calculations m according to the first Newton's method. The number of loop calculations according to the second Newton's method is restricted, whereas the number of loop calculations m according to the first Newton's method is increased, thereby enhancing calculation speed and calculation accuracy.

The use of Newton's method in two stages for determination of a reached time t(step_n) is expressed as Formula 5 based on Formula 3 and Formula 4.

$$t_{loop\_m+1} \cong t_{loop\_m} - \{f_x(t_{loop\_m}) - x_{step\_n}\} \cdot s_{loop\_l+1}$$ [Formula 5]

Accordingly, the reached time t(step_n) can be determined without solving a complicated function $f_x(t)$. Moreover, the reached time t(step_n) can be determined even if a reciprocal calculation is omitted.

In the speed control of the stepping motor 104 as described above, a step time which is a pulse signal application time needs to be set, and the step time is a reached time difference of t(step_n)−t(step_n−1). While step driving the stepping motor, calculation of the reached time and update of the step time are successively performed, so that desired acceleration and deceleration control can be achieved.

Next, a description is given of an example of a solution method by which the step time calculation unit 202 of the drive control unit 102 determines a reached time t(step_n) by applying the above-described Newton's method in two stages.

Figure 3:
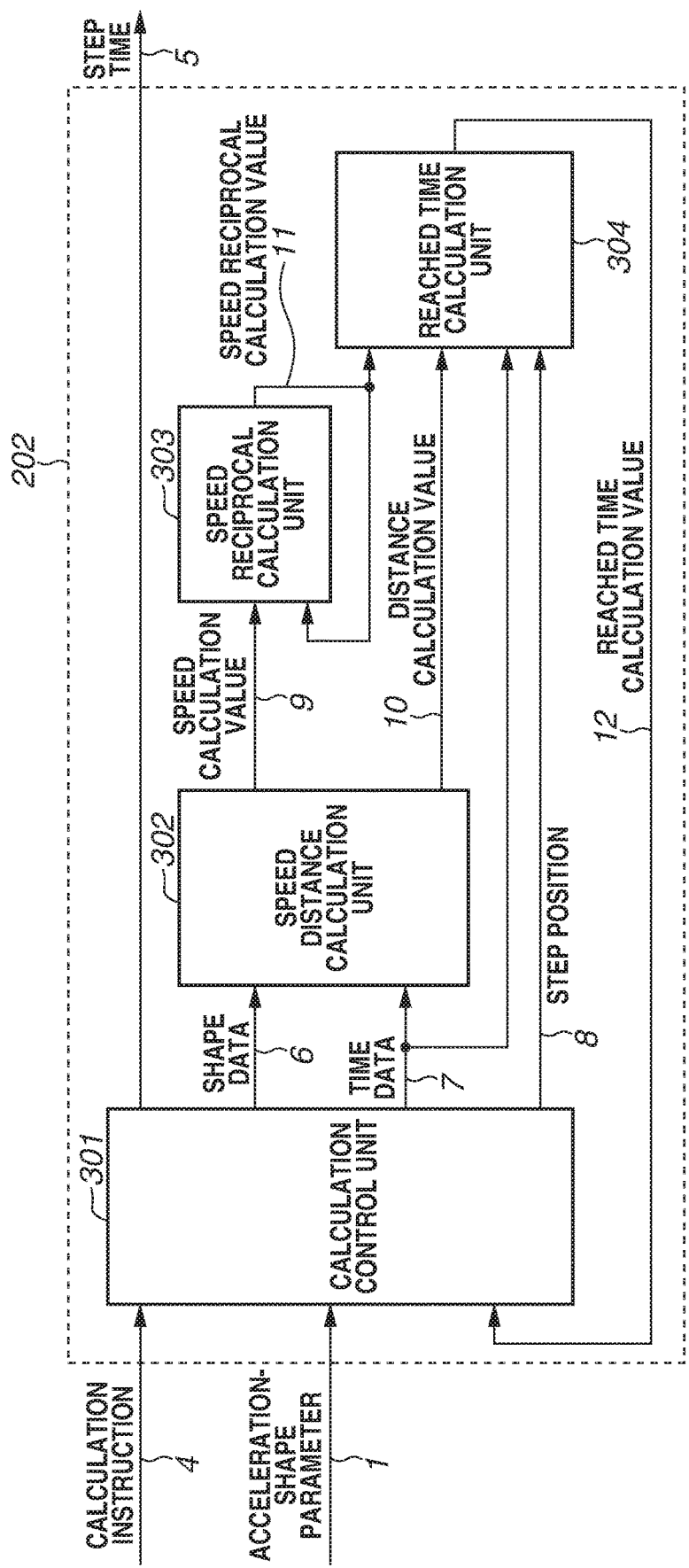
FIG. 3 is a block diagram illustrating a step time calculation unit of the drive control unit according to the first exemplary embodiment.

FIG. 3 is a diagram illustrating a configuration of the step time calculation unit 202 of the drive control unit 102. Each unit of the step time calculation unit 202 can function if, for example, a central processing unit (CPU) reads a program stored in a hard disk and executes the program.

A calculation control unit 301 executes a loop calculation according to the first Newton's method for determining a reached time t(step_n) based on the calculation instruction 4 received from the drive waveform generation unit 201 as a trigger.

The calculation control unit 301 outputs shape data 6 and time data 7 to a speed distance calculation unit 302, and outputs the time data 7 and a step position 8 to a reached time calculation unit 304. Subsequently, the calculation control unit 301 outputs the step time 5 which is a final calculation result to the drive waveform generation unit 201.

The shape data 6 represents coefficient parameters that are necessary to respectively determine a speed v and a distance x in Formula 1.

The time data 7 represents t(loop_m) in the loop calculation according to the first Newton's method. In step S401 of FIG. 4A, when an calculation is started (an initial loop calculation is started), the calculation control unit 301 sets an initial value of the time data 7 for t(loop_m). The initial value can be a fixed value that is set beforehand, or a reached time t(step_n−1) that is determined by the previous step ((n−1)th step). Since a step linearly increases at the time of acceleration and deceleration control of the stepping motor 104, the reached time t(step_n−1) determined by the previous step ((n−1)th step) becomes a value closer to a solution to be determined and has a higher convergence speed. Moreover, subsequent to the initial loop calculation, the calculation control unit 301 uses a reached time calculation value 12 that is output from the reached time calculation unit 304.

The step position 8 represents information indicating the current step, and is information the same as step_n. The step position 8 can be included in the acceleration-shape parameter 1. Since the step position 8 in the stepping motor 104 is in proportion to the number of issuances of the calculation instruction 4, a counter can be arranged in the calculation control unit 301. In such a case, the step position 8 can be generated inside the calculation control unit 301.

After a loop calculation of m-th time is finished, the calculation control unit 301 outputs the step time 5. The calculation control unit 301 retains at least a reached time t(step_n−1) determined in the previous step ((n−1)th step), and calculates the step time 5 as t(step_n)−t(step_n−1).

The speed distance calculation unit 302 outputs a speed calculation value 9 and a distance calculation value 10 based on the shape data 6 and the time data 7. Each calculation is executed according to a formula for determining the speed v or the distance x of Formula 1. Moreover, a formula to be referred differs depending on the area 1, 2, or 3. Such area determination is performed by referring to the time data 7. For example, if time data 7≤$t_1$, the area 1 is provided. If $t_1$<time data 7≤$t_2$, the area 2 is provided. In other cases, the area 3 is provided.

A speed reciprocal calculation unit 303 applies the second Newton's method with respect to a reciprocal of a derivative $f'_x(t(loop\_m))$ (i.e., a reciprocal of speed), executes a calculation according to Formula 4 to determine a speed reciprocal calculation value 11, and outputs the speed reciprocal calculation value 11 to the reached time calculation unit 304.

In step S411 of FIG. 4B, at the beginning of the calculation (the initial loop calculation), the speed reciprocal calculation unit 303 sets an initial value for s(loop_l) being in the loop calculation according to the second Netwton's method. The initial value can be a fixed value that is set beforehand, or a speed reciprocal calculation result s(loop_m−1) of the previous upper-level loop_m. At the time of acceleration and deceleration control of the stepping motor 104, t(loop_m) monotonically increases, and the speed reciprocal calculation result s(loop_m−1) of the previous upper-level loop_m becomes a value closer to a solution to be determined and has a higher convergence speed. Moreover, subsequent to the initial loop calculation, the previous result s(loop_l−1) is used in the loop calculation as illustrated in Formula 4.

The reached time calculation unit 304 outputs the reached time calculation value 12 according to Formula 5 based on not only the time data 7 and the step position 8, but also the distance calculation value 10 and the speed reciprocal calculation value 11 which have been determined.

In the configuration example illustrated in FIG. 3, the calculation control unit 301, the speed distance calculation unit 302, and the reached time calculation unit 304 function as a first calculation unit according to the present exemplary embodiment, whereas the speed reciprocal calculation unit 303 functions as a second calculation unit according to the present exemplary embodiment.

Therefore, execution of the loop calculation according to the first Newton's method and the loop calculation according to the second Newton's method enables a reached time t(step_n) to converge on a theoretical solution. Calculation accuracy depends on the physical theoretical formula of Formula 1 and the number of loops, or an initial value. In such a case, since an elapsed time or a step position during acceleration and deceleration of the stepping motor 104 is continuous, the use of the previous calculation result as an initial value can markedly reduce the number of loop calculations, and can perform a process at higher speed. Moreover, a physical theoretical formula such as Formula 1 can be applied as is to determine a solution, and an approximation equation for the solution does not necessarily have to be used. Hence, calculation accuracy is fundamentally enhanced, and a component such as a memory that is used when a solution is referred is not necessary.

Accordingly, a pulse signal application time for enabling ideal speed control expressed by a physical theoretical formula to be achieved can be calculated with high accuracy, at high speed, and with small calculation load, so that high responsiveness can be achieved in stepping motor speed control based on a physical theory.

A second exemplary embodiment will be described using an example case in which determination of a reciprocal of speed v differs from that described in the first exemplary embodiment. Hereinafter, components and configurations that differ from the first exemplary embodiment will be mainly described, and like components will be given the same reference numerals as the first exemplary embodiment and description thereof will be omitted.

FIG. 7 is a diagram illustrating a configuration of a step time calculation unit 202 of a drive control unit 102. Unlike the configuration illustrated in FIG. 3 according to the first exemplary embodiment, the step time calculation unit 202 includes a step time use speed reciprocal calculation unit 701 instead of the speed reciprocal calculation unit 303, and a step time output processing unit 702.

A step time to be used for drive control of a stepping motor is time information necessary to rotate the stepping motor by a certain step angle, and is information similar to a reciprocal numerical value of speed. Accordingly, a difference between a time acquired during the loop calculation according to a first Newton's method in a calculation control unit 301 and a time with respect to a distance of (n−1)th step is provided to a reciprocal of speed. Specifically, t(loop_m)−t(step_n−1) is output as an intermediate step time 13 from the calculation control unit 301 during the loop calculation according to the first Newton's method for determining a reached time t(step_n), and the output value is used as a latest speed reciprocal numeric value by the step time use speed reciprocal calculation unit 701.

The step time use speed reciprocal calculation unit 701 uses the intermediate step time 13 as a reciprocal of speed, so that convergence speed can be markedly enhanced. Accordingly, a calculation using a second Newton's method involving a plurality of loop calculations as that conducted in the first exemplary embodiment can be omitted.

The intermediate step time 13 eventually becomes a step time that is intended to be determined. The step time output processing unit 702 outputs the intermediate step time 13 as a step time 5 only when a convergence calculation according to the first Newton's method is finished so that only the eventual value is output.

Accordingly, execution of only the loop calculation according to the first Newton's method (precisely, a calculation loop according to the second Newton's method is 1) enables a reached time t(step_n) to converge on a theoretical solution, and a process to be performed at higher speed than the first exemplary embodiment.

The present exemplary embodiment can be applied to a stepping motor to be used for, for example, a movable unit of a network camera, a manufacturing apparatus, or a robot hand, and can enhance speed control performance of the movable unit. For example, the network camera includes a CPU, a read only memory (ROM), a random access memory (RAM), an image capturing unit, a movable unit (a pan head), and a network interface.

Each of the exemplary embodiments has been described with reference to a specific example, and such description is not intended to limit the technical scope of the exemplary embodiment. That is, various modifications and enhancements are possible without departing from the technical idea or the main characteristic of the exemplary embodiment.

Each of the above exemplary embodiments has been described using a physical theoretical formula represented by Formula 1, but is not limited to the physical theoretical formula. Even if Formula 1 is modified, such a modified formula can be applied. In other words, even if Formula 1 is modified, the modified calculation formula can be readily applied to the exemplary embodiment by modifying only a calculation formula to be employed by the speed distance calculation unit 302.

Aspects of the disclosure can be achieved by a process in which a program for performing one or more functions of each of the above exemplary embodiments is supplied to a system or an apparatus via a network or a storage medium, and one or more processors in a computer of the system or apparatus reads and executes the program. Moreover, aspects of the embodiments can be achieved by a circuit (e.g., application specific integrated circuit (ASIC)) for performing one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-079028, filed Apr. 12, 2017, which is hereby incorporated by reference herein in its entirety.

What is claimed is:

1. A motor control apparatus that controls a stepping motor, the apparatus comprising:
    a calculation unit configured to determine a time with respect to a distance of n-th step (n is a positive integer) to calculate a step time, which is a pulse signal application time with respect to the stepping motor, based on a theoretical formula expressing a parameter in an acceleration period or a deceleration period of the stepping motor,
    wherein the calculation unit includes a first calculation unit configured to apply an iterative root-finding procedure to a distance which is a function of a time included in the theoretical formula to determine the time with respect to the distance of the n-th step expressed using a reciprocal of a derivative of the function, a second calculation unit configured to apply the iterative root-finding procedure to the reciprocal of the derivative to determine the reciprocal of the derivative at a time when the first calculation unit determines the time with respect to the distance of the n-th step, and wherein number of loops according to the iterative root-finding procedure in the second calculation unit is smaller than number of loops according to the iterative root-finding procedure in the first calculation unit.

2. The motor control apparatus according to claim 1, wherein the calculation unit calculates the step time as a difference between the time with respect to the distance of the n-th step and a time with respect to a distance of (n-1)th step.

3. The motor control apparatus according to claim 1, wherein, at a time of applying the iterative root-finding procedure, the first calculation unit sets a time with respect to a distance of (n-1)th step as an initial value.

4. The motor control apparatus according to claim 1, wherein, at the time of applying the iterative root-finding procedure, the second calculation unit sets a reciprocal of speed acquired by a previous loop calculation according to the iterative root-finding procedure in the first calculation unit as an initial value.

5. The motor control apparatus according to claim 1, wherein the acceleration period or the deceleration period includes an increasing acceleration area in which an acceleration rate increases, a constant acceleration area in which an acceleration rate is constant, and a decreasing acceleration area in which an acceleration rate decreases.

6. The motor control apparatus according to claim 1, wherein the motor control apparatus controls the stepping motor in such a manner that a change in speed with respect to time forms a trapezoidal shape.

7. The motor control apparatus according to claim 1, wherein the stepping motor controls a movable unit of a network camera or a robot hand.

8. The motor control apparatus according to claim 1, wherein the theoretical formula is a cubic function formula for time.

9. A motor control method for controlling a stepping motor, the method comprising:
calculating a time with respect to a distance of n-th step (n is a positive integer) to calculate a step time, which is a pulse signal application time with respect to the stepping motor, based on a theoretical formula expressing a parameter in an acceleration period or a deceleration period of the stepping motor,
wherein the calculating includes making a first calculation in which an iterative root-finding procedure is applied to a distance which is a function of a time included in the theoretical formula to determine the time with respect to the distance of the n-th step expressed using a reciprocal of a derivative of the function,
making a second calculation in which the iterative root-finding procedure is applied to the reciprocal of the derivative to determine the reciprocal of the derivative at a time when the time with respect to the distance of the n-th step is determined by the first calculation, and
wherein number of loops according to the iterative root-finding procedure in the second calculation unit is smaller than number of loops according to the iterative root-finding procedure in the first calculation unit.

10. The motor control method according to claim 9, wherein, in the calculating, the step time is calculated as a difference between the time with respect to the distance of the n-th step and a time with respect to a distance of (n-1)th step.

11. The motor control method according to claim 9, wherein, at a time of applying the iterative root-finding procedure in the first calculation, a time with respect to a distance of (n-1)th step is set as an initial value.

12. The motor control method according to claim 9, wherein, at the time of applying the iterative root-finding procedure in the second calculation, a reciprocal of speed acquired by a previous loop calculation according to the iterative root-finding procedure in the first calculation is set as an initial value.

13. The motor control method according to claim 9, wherein the acceleration period or the deceleration period includes an increasing acceleration area in which an acceleration rate increases, a constant acceleration area in which an acceleration rate is constant, and a decreasing acceleration area in which an acceleration rate decreases.

14. The motor control method according to claim 9, wherein the stepping motor is controlled in such a manner that a change in speed with respect to time forms a trapezoidal shape.

15. The motor control method according to claim 9, wherein the stepping motor controls a movable unit of a network camera or a robot hand.

16. The motor control method according to claim 9, wherein the theoretical formula is a cubic function formula for time.

17. A non-transitory storage medium storing a program causing a computer to perform a motor control method for controlling a stepping motor, the method comprising:
calculating a time with respect to a distance of n-th step (n is a positive integer) to calculate a step time, which is a pulse signal application time with respect to the stepping motor, based on a theoretical formula expressing a parameter in an acceleration period or a deceleration period of the stepping motor,
wherein the calculating includes making a first calculation in which iterative root-finding procedure is applied to a distance which is a function of a time included in the theoretical formula to determine the time with respect to the distance of the n-th step expressed using a reciprocal of a derivative of the function,
making a second calculation in which the iterative root-finding procedure is applied to the reciprocal of the derivative to determine the reciprocal of the derivative at a time when the time with respect to the distance of the n-th step is detected by the first calculation, and
wherein number of loops according to the iterative root-finding procedure in the second calculation unit is smaller than number of loops according to the iterative root-finding procedure in the first calculation unit.

* * * * *